June 23, 1959   K. R. WEST ET AL   2,891,809
SPRING CLIP
Filed Aug. 13, 1958
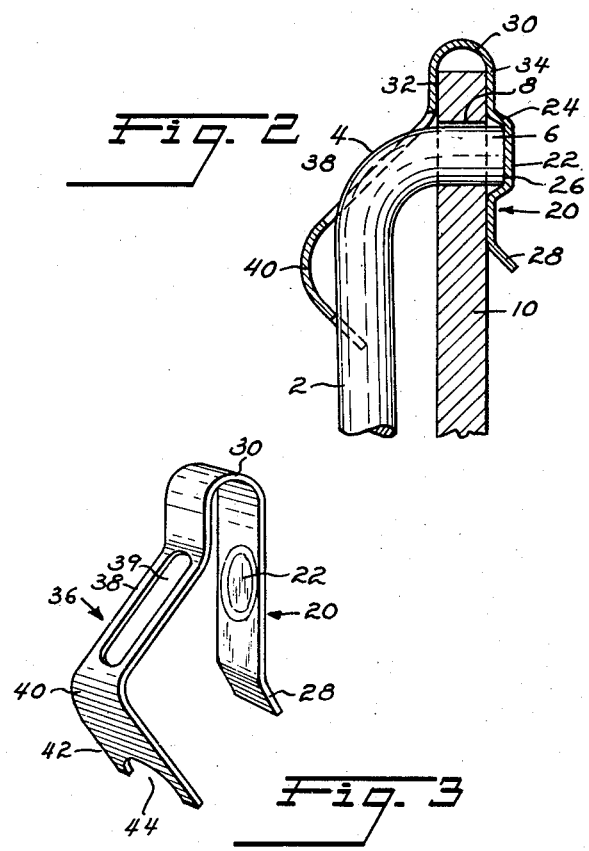
INVENTOR
KENNETH R. WEST
WILLIAM M. WOOD
BY Scrivener & Parker
ATTORNEYS

United States Patent Office 2,891,809
Patented June 23, 1959

2,891,809

SPRING CLIP

Kenneth R. West, Livonia, and William M. Wood, Ann Arbor, Mich., assignors to Associated Spring Corporation, Bristol, Conn., a corporation of Delaware Application August 13, 1958, Serial No. 754,835

3 Claims. (Cl. 287—93)

This invention relates broadly to spring clips which are designed and intended to hold two parts together and, more particularly, provides a spring clip for connecting together a rod having one end bent, and a second member having a hole within which the bent end of the rod is received, the spring clip being so constructed and related to the two parts which it connects as to permit them to be pivoted with respect to each other.

Two such parts form a mechanical linkage of great utility in many mechanical applications, such as the carburator assembly rods and the accelerator connecting linkage of an internal combustion engine, and the door latch and lock operating linkage of an automobile. Such parts as those described are usually connected by means of a cotter pin which extends through a transverse hole in the end of the bent end of the rod on the opposite side of the flat part from the rod. While such a cotter pin connection will prevent separation of the rod and the flat it has many disadvantages, among which are the necessity of forming the hole in the rod, providing the cotter pin as a separate part, and the inability of the cotter pin to prevent the radius part of the rod from riding down on the flat, causing binding between the two parts.

In accordance with the invention the cotter pin connection is eliminated and the rod and flat are connected by means of a spring clip which engages the rod and also engages the flat on the opposite side thereof from the rod, thus resiliently holding the bent end of the rod within the hole in the flat and at the same time, by engaging the end surface of the bent end of the rod on the opposite side of the flat from the rod, preventing movement of the bent end of the rod into the hole to an extent which would cause binding between the two parts. Such a clip connecting the two parts in a resilient manner increases the stability of the pivotal connection between the parts and reduces vibrating between them while permitting very easy assembly of the parts and separation thereof after assembly.

The invention is described in the following specification and is illustrated in the accompanying drawing, in which:

Fig. 1 is a plan view of two pivotally related members connected by a clip according to the present invention;

Fig. 2 is an enlarged partial sectional view taken on line 2—2 of Fig. 1, and

Fig. 3 is a perspective view of the clip provided by the invention.

Two parts which are to be connected in pivotal relation are disclosed in Figs. 1 and 2 of the drawings and comprise a rod 2 of circular cross section bent at 4 to form an end part 6 which extends at right angles to the length of the rod and is received within and passed through a hole 8 in a member 10 which, as shown in the drawings, is an elongated, narrow, flat rod such as usually forms a part of linkages of the type with which the clip provided by the invention is particularly useful. These two parts are known as a rod and a flat and will be so referred to in this specification.

Means are provided by the invention for connecting the rod and the flat in such a way that the rod may pivot about its bent end 6 while, at the same time, the parts are held from accidental separation and the rod is held away from the flat to prevent binding between the flat and the radius part 4 of the rod. Such means comprise a unitary device formed of spring strip metal which is generally U-shaped in configuration having a first generally flat leg 20 adjacent one end which is provided intermediate its ends with a circular, outwardly dished portion 22 having an outwardly inclined annular side wall 24 and the bottom of which is of substantially the same size as the end surface 26 of the bent end of the rod. At its outer end the flat part 20 is turned outwardly for a short distance as shown at 28 to facilitate snapping the clip over the ends of the flat and rod, as will be described.

Between its ends the clip is formed with a return bend part 30 and for a short distance the two arms of this bend are parallel as shown at 32, 34, the part 34 forming part of the first leg 20 of the clip and the part 32 forming part of the second leg 36 of the clip. Outwardly of the flat part 32 the second leg 36 of the clip is turned outwardly at an obtuse angle to part 32 to form an elongated flat part 38 and is then turned inwardly at 40 toward leg 20 to form a substantially flat end part 42 which is disposed substantially at right angles to the part 38. The intermediate flat part 38 is provided with an elongated opening 39 therein extending lengthwise of the clip and being preferably slightly narrower than the rod 2. At the end extremity of the second leg 36 of the clip the part 42 is provided with a substantially semi-circular opening 44 which, at its widest part is slightly narrower than the rod 2.

In the use and operation of the clip provided by the invention, the rod and flat are first assembled by inserting the bent end 6 of the rod into and through the hole 8 in the flat, thus placing these two parts in the normal, intended positions which they will occupy in use. The clip is now forced downwardly over the end of the flat above the hole 8 with the inner surface of the leg 20 abutting the outer surface of the flat on the side thereof opposite to that adjacent the rod. As the clip is moved into position the semi-circular opening 44 in the end part of the second leg 36 will ride along the outer surface of the rod. When the clip has been sufficiently pushed onto the rod and flat assembly the outer end of the bent part of the rod will snap into the depression 22 in the leg 23, thus holding the clip from any further undesired movement in either direction. At the same time, the elongated opening 39 in part 38 of the second leg will snap over the radius part 4 of the rod and will securely embrace and surround the outer surface part of such radius part. Also, at the same time, the semi-circular opening in the end of the outer part 42 of the leg 36 will surround about one-half the circumference of the rod in the final position of the clip.

It will be seen that when the clip is in its final position, as described, any movement of the clip longitudinally of the rod and flat is prevented by the positioning of the end of the bent part of the rod within the depression 22 in leg 20 of the clip. Further, the parts 38 and 42 of the second leg of the clip resiliently bear on the rod, forcing it toward the flat to hold the two parts in proper engagement with each other, while the abutment of the end of the bent part of the rod against the bottom wall of the dished part 22 of arm 20 prevents any excessive movement of the rod toward the flat which would result in binding between the flat and the radius part of the rod.

While I have described and illustrated certain embodiments of my invention, it will be apparent to those skilled in the art that other embodiments, as well as modifications of those disclosed, may be made and practiced without departing in any way from the spirit or scope of the invention for the limits of which reference must be had to the appended claims.

What is claimed is:

1. A spring clip for holding in assembled relation a rod having a bent end and a flat element having a hole therethrough through which the end of the bent end of the rod is passed, said clip comprising a generally U-shaped device formed by bending and forming a spring metal strip and having two legs, one of said legs being substantially flat and having intermediate its ends an outwardly dished part large enough and properly shaped to receive the end of the bent end of the rod when the clip is in assembled relation to the rod and flat element, the other of said legs having a flat intermediate part extending outwardly away from the first leg at an obtuse angle and having an elongated opening therein extending lengthwise of the clip and adapted to receive the outer part of the radius part of the rod when the clip is in assembled relation to the rod and flat element, the second leg of the clip also having a part at its free end which is connected to the intermediate part of said leg by a curved part which extends from the intermediate part toward the first leg and which has a substantially semi-circular opening in the free end thereof which is adapted to receive the outer surface of the rod when the clip is in assembled relation to the rod and flat element.

2. A spring clip for holding in assembled relation a rod having a bent end and a flat element having a hole therethrough through which the end of the bent end of the rod is passed, said clip being formed from a spring metal strip and having two legs connected by a return bend part, one of said legs being substantially flat and having intermediate its ends an outwardly dished part, the other of said legs having an intermediate part and an end part, the intermediate part extending outwardly away from the first leg at an acute angle and having an elongated opening therein extending lengthwise of the clip and the end part extending from the intermediate part toward the first leg and having a substantially semi-circular opening in the end thereof.

3. In combination, a rod having a bent end connected to the rod by a radius part, a flat element having a hole adjacent one end thereof through which the bent end of the rod is passed, and a spring clip assembled to the rod and flat element and holding said parts in assembled relation, said clip comprising two legs connected by a reverse bend part, the first of said legs being substantially flat and being in face-to-face abutment with the surface of the flat element on the opposite side of the surface thereof which is adjacent the main section of the rod and having intermediate its ends an outwardly dished part within which the end of the bent end of the rod is positioned, the second of said legs comprising a substantially flat intermediate part having an elongated opening therein through which the outer part of the radius part of the rod extends and also having a substantially flat end part having a substantially semi-circular opening in its end edge, the intermediate part of the second leg extending outwardly away from the first leg at an acute angle and the end part of the second leg being connected to the intermediate part by an outwardly curved part and extending toward the first leg.

No references cited.